United States Patent [19]

McQueen

[11] Patent Number: 5,272,619
[45] Date of Patent: Dec. 21, 1993

[54] INVERTOR SYSTEMS UTILIZING INDUCTIVE OR CAPACITIVE REACTANCE

[76] Inventor: Clarence W. McQueen, 110 Sitting Bull Dr., P.O. Box 781, Hailey, Id. 83333

[21] Appl. No.: 775,293

[22] Filed: Oct. 8, 1991

[51] Int. Cl.$^5$ .................................. H02M 7/44
[52] U.S. Cl. ........................................ 363/140
[58] Field of Search ............... 363/13, 15, 95, 101, 363/140, 152

[56] References Cited

U.S. PATENT DOCUMENTS

| | | | |
|---|---|---|---|
| 2,678,419 | 5/1954 | Bennett | 363/140 |
| 2,834,934 | 5/1958 | Koppel | 363/140 |
| 2,854,605 | 9/1958 | Belamin | 363/140 |
| 2,942,173 | 6/1960 | Hoskinson | 363/140 |
| 3,638,097 | 1/1972 | Hardie | 363/140 |
| 4,618,809 | 10/1986 | Maeda | 363/154 |
| 4,644,241 | 2/1987 | Maeda | 363/154 |

*Primary Examiner*—Jeffrey Sterrett

[57] ABSTRACT

This disclosure consists of two fluxgates, a signal generator and an invertor transformer. Signal current flowing from right to left through the signal coil of a first fluxgate allows power current flow from left to right through the power coil, adding energy to the signal current and hence on through a second fluxgate trigger coil. Simultaneously signal current, enhanced by the induced power current, is moving from left to right through the signal coil on the second fluxgate and prevents power current flow from left to right in the power coil of the second fluxgate. Power current flowing through the trigger coil on the second fluxgate reduces energy stored in the core, allowing the signal current to reverse cycle. Energy induced into the signal circuit by the power coil passes back into the power circuit through the trigger coil and the collapse of the magnetic field upon completion of the second quarter of the cycle. This action produces a pulse of one-half cycle and upon reversal of the signal current the above cycle is duplicated in reverse and alternate pulses are produced. These alternate pulses travel in opposite direction through separate primaries in an invertor transformer producing alternating current in a secondary circuit.

2 Claims, 4 Drawing Sheets

INVERTER SYSTEMS

INVERTER SYSTEMS

INVERTER SYSTEMS

INVERTOR SYSTEMS UTILIZING INDUCTIVE OR CAPACITIVE REACTANCE

BACKGROUND OF THE INVENTION

1. Field of the Invention.

This invention relates generally to the conversion of direct current to alternating current and more particularly to the conversion of high KVA direct current to single and polyphase alternating current of high KVA.

2. Description of Related Art

There are many ways of converting D.C. to A.C., most utilizing vacuum tubes, transistors, triodes or other switching devices to pulse the direct current. These devices work very well on small power requirements but are not at all suitable in the high KVA range.

Koppel 2,834,934, May 1968, uses a dual core magnetic amplifier and claims to modify low direct current from a thermocouple or other reversible polarity direct current for purposes of controlling a furnace feed valve. This system is only suitable for very low current and does not produce alternating current.

The standard invertor used for many years consisted of a direct current motor to drive an alternating current generator. This system is not suitable for high voltage applications.

The system used to convert D.C. to A.C. by Bonneville Power Administration, consists of a series of motor driven tilt plate resistance devices similar to the old tilted plate voltage regulator. This system has resistance loses and the electrical contacts wear out.

The conversion of direct current to polyphase alternating current utilizes switching devices, such as vacuum tubes or transistors, to pulse the direct current. Reference 3,638,097, Hardie, January 1972.

The conversion of single phase to polyphase also uses transistors. Reference 4,618,809, Maeda, October 1986 and 4,644,241, Maeda, February 1987.

SUMMARY

It is the object of my invention to provide an improved method of converting direct current to single phase or polyphase alternating current.

It is another object of my invention to provide electro magnetic flux gates for pulsing direct current in such a way as to produce alternating current when passed through a multiple coil transformer.

It is yet another object of my invention to provide a third coil on the flux gate to compensate for core retentivity and to reduce resistance to current flow in that flux gate.

It is yet another object of my invention to provide rectifiers to prevent the introduction of the signal current into the power coils.

The aforementioned and other objects of this invention are accomplished by flux gates consisting of a signal coil, a power coil and a trigger coil.

The signal coil will accelerate or retard the flow of direct current through the power coil. The power current then flows through the power coils and builds up the magnetic field in the core. The power current then flows in a reverse direction through the trigger coil in the other flux gate and reduces the retentivity to zero and at the same time will accelerate the power current through said other flux gate. The rectifiers in the direct current line prevent introduction of signal current into the power circuit. The pulsed direct current is then passed through alternate primary coils in opposite directions through an invertor transformer consisting of two primary and one secondary coil. These actions produce an alternating current in the secondary coil. The production of polyphase current is achieved by ganging or grouping these systems with each system a specified degree out of phase with each other. The secondaries of the invertor transformers are wired as either Wye or Delta connections.

DESCRIPTION OF THE PREFERRED EMBODIMENT

Figure 1:
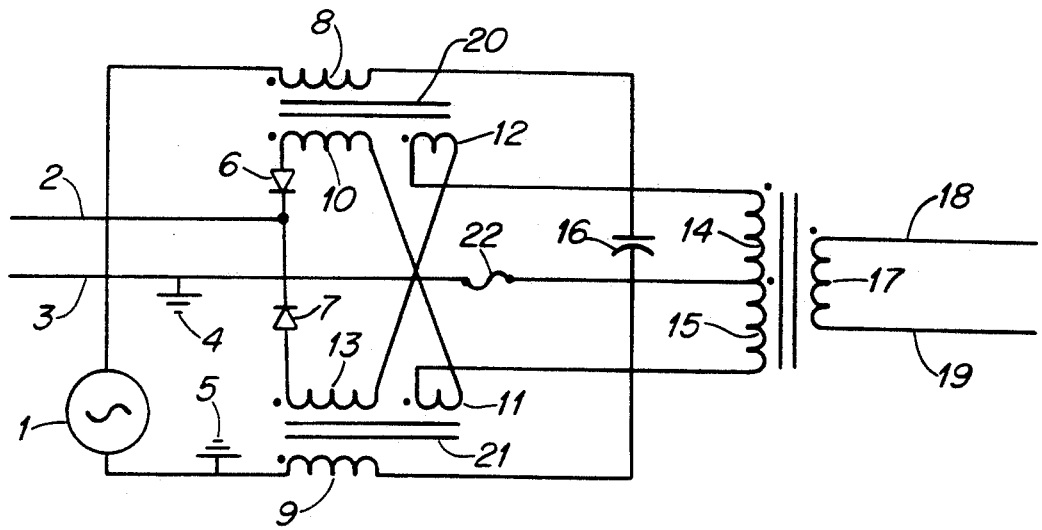
FIG. 1 is a schematic diagram of the D.C. to A.C. invertor. This is the preferred embodiment.

Referring to FIG. 1, signal generator 1 supplies current to the flux gate signal coils 8 and 9. This circuit is completed at capacitor 16. Direct current conductor 2 passes current alternately through rectifiers 6 and 7 and then through the flux gate power coils 10 and 13. The current passing through power coil 10 also passes through trigger coil 11. This action results in a reduction of the magnetic field in core 21 and as the field collapses in core 21 the D.C. from line 2 through rectifier 7 is attracted and begins to flow through the power coil 13. At this point the signal current is passing out of signal coil 8 and the power current is passing in a reverse direction through trigger coil 12. This action collapses the field in core 20, which induces the flow of current from conductor 2 through rectifier 6 and power coil 10.

As current passes through power coil 10 it overrides the trigger coil 12 and the signal coil 8 and continues through trigger coil 11. This process then reverses itself, as determined by the signal generator 1.

As the current passes through trigger coil 11 it proceeds through the invertor transformer primary coil 15, thereby producing a pulse in invertor transformer secondary coil 17. This current then proceeds through circuit breaker or fuse 22 to the other D.C. conductor. When this cycle reverses, the power current through trigger coil 12 proceeds on through the invertor transformer primary coil 14, thereby producing a pulse opposite to that produced by coil 15 in secondary coil 17. The current through coil 14 then passes through circuit breaker or fuse 22 to the other D.C. conductor. Conductors 18 and 19 then conduct the alternating current to the load.

Common ground 4 and 5 of the signal generator and direct current lines are desirable for more efficient operation of the system.

Figure 2:
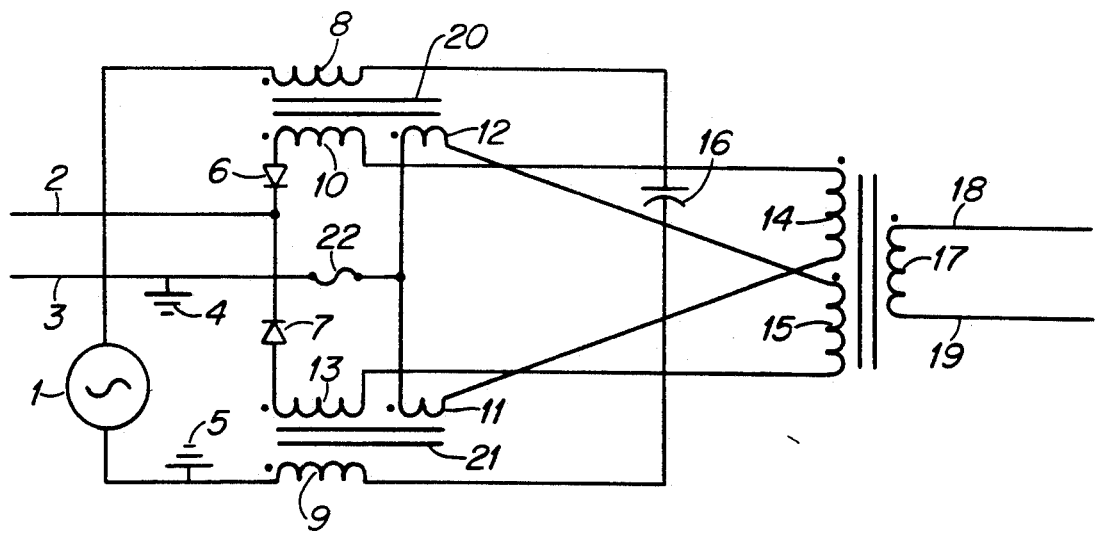
FIG. 2 is a schematic diagram of a similar invertor with the only difference being the connections between the invertor transformer and the flux gates. In this version the power coil is connected directly to the invertor transformer primary and the invertor transformer output is connected to the trigger coil and the trigger coil is connected to the other D.C. conductor.

Reference to FIG. 2. This configuration is quite similar to FIG. 1 with exceptions as follows: As the current leaves flux gate power coil 10 it proceeds to invertor transformer primary coil 14 and then to trigger coil 11, flowing through coil 11 in a reverse direction and then on through circuit breaker or fuse 22 and to D.C. conductor 3 to complete the circuit. On the other half cycle current leaves flux gate power coil 13 and proceeds through invertor transformer coil 15 and then back through trigger coil 12 and on through fuse 22 to conductor 3 to complete the circuit.

Figure 3:
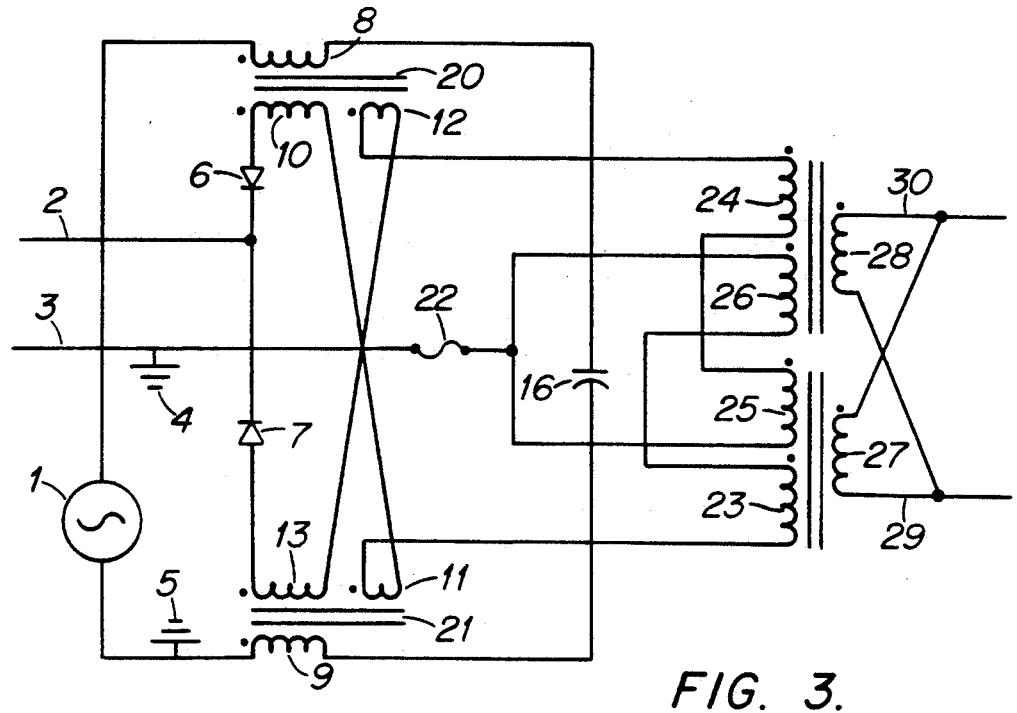
FIG. 3 is a schematic diagram of an invertor similar to FIG. 1, with the difference being that a dual core invertor transformer is used in lieu of a single core.

Reference to FIG. 3. This system is similar to FIG. 1 with the following exceptions: As the current leaves the flux gate trigger coil 12 it goes through the dual core invertor transformer primary coil 24 and thence through the dual core invertor transformer balance coil 25 in a reverse direction, to the other core, and then on through fuse 22 to conductor 3 to complete the circuit. In the reverse half cycle the current goes from flux gate coil 11 through the dual core invertor transformer primary coil 23 and then through the dual core invertor transformer balance coil 26 in a reverse direction, to the other core, and on through fuse 22 to conductor 3 to complete the circuit. Coils 27 and 28 then feed the alternating current through conductors 29 and 30 to the load. Under certain conditions this system functions slightly better than the system described in FIG. 1.

Figure 4:
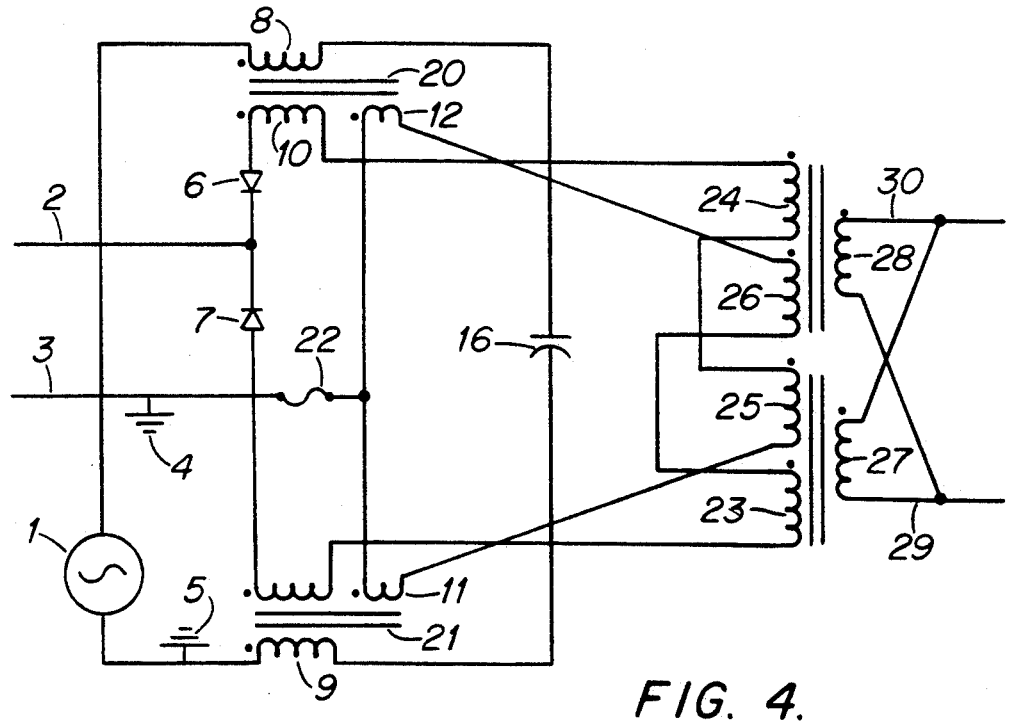
FIG. 4 is a schematic diagram of an invertor similar to FIG. 3, with the exception that the power coils are connected to the dual core invertor transformer primaries and these primaries are connected to the other trigger coils and with the trigger coils connected to the other D.C. conductor.

Reference to FIG. 4. This system is similar to FIG. 3 with the following exceptions: When the current leaves flux gate power coil 10 it passes through dual core invertor transformer primary coil 24 and then passes in reverse, to the other core, through the dual core transformer balance coil 25 and thence back in reverse, to the core, through the flux gate trigger coil 11 and then through circuit breaker 22 to conductor 3 to complete the circuit. In the reverse half of the cycle, current flows from the flux gate power coil 13 through the dual core invertor transformer primary coil 23 and then flows backwards, to the core, through the dual core invertor transformer balance coil 26 and thence on through the flux gate trigger coil 12 in the opposite direction, to the core, and then on through fuse 22 to conductor 3 to complete the circuit.

This system, as depicted in FIG. 4, performs slightly better under certain conditions.

Figure 5:
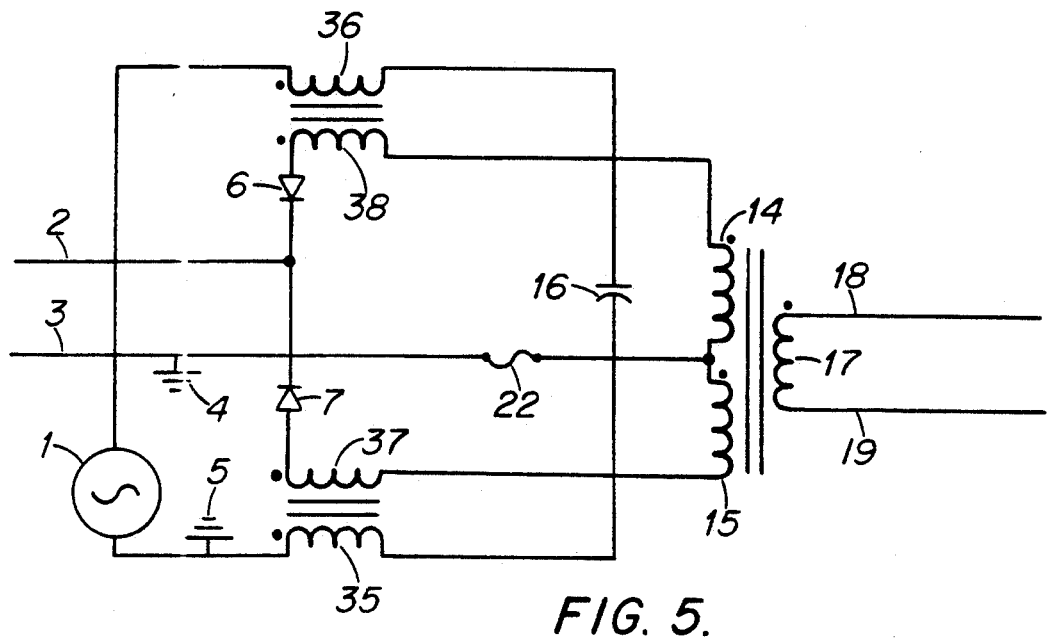
FIG. 5 is a schematic of a D.C. to A.C. invertor utilizing flux gates without trigger coils. This system can only be used with very high current in the signal coil and very low retentivity in the core.

Reference to FIG. 5. This system is similar with the exceptions that a trigger coil is not included in the flux gate configuration and no core is indicated in the flux gates between coils 36 and 38 or between coils 35 and 37. This configuration is only usable if the volt/amps in the signal circuit are sufficient to overpower the direct current and the retentivity of the core, such as air, is a minimum. There would be very few uses for this configuration.

The operation of this configuration is as follows: The signal generator produces a current that alternates between coils 35 and 36. The magnetic fields established by coils 35 and 36 alternately accelerate or stop the flow of current through coils 37 and 38. This will produce an alternate pulsed direct current that upon passing through coils 14 and 15 will induce an alternating current through coil 17.

Figure 6:
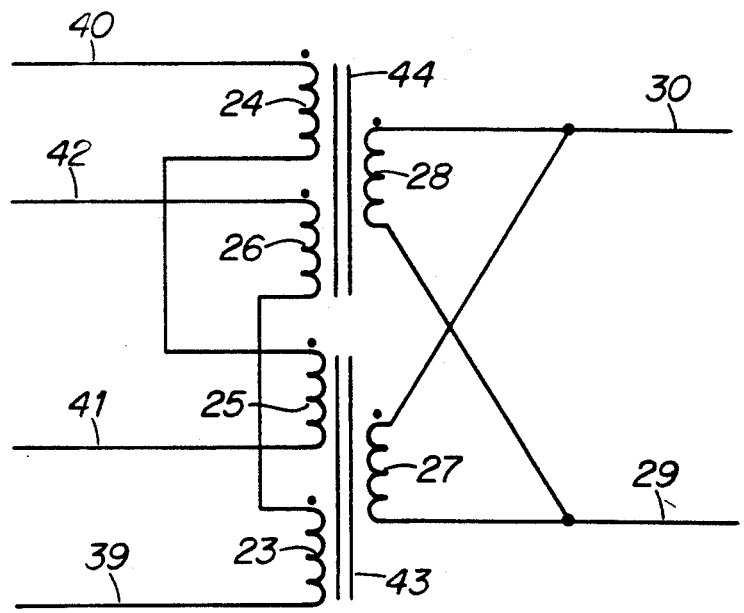
FIG. 6 is a schematic of a dual core invertor transformer. The utilization of this invertor transformer produces a better wave form in some circumstances.

Reference to FIG. 6. This is a dual core invertor transformer that can be used with inductive reactance flux gates to produce alternating current from direct current. This system functions as follows: A pulsed direct current flows through conductor 40 and through primary coil 24. This action produces changes in the magnetic field of core 44 which in turn induces a flow of current through coil 28 and out through conductor 30, as this pulsed direct current continues on through coil 25 in an opposite direction to the current that will or has flowed through coil 23. It also changes the magnetic field in core 43 which in turn induces a flow of current through coil 27 and out through conductor 30. When the cycle is reversed, current flow from conductor 39 passes through coil 23 causing changes in the magnetic field of core 43, thereby inducing a flow of current through coil 27 and out through conductor 29. This pulsed direct current then continues on through coil 26 in a reverse direction to the current that has or will flow through coil 24, thereby changing the magnetic field in core 44. This action produces a current flow through coil 28 and out into conductor 29. Conductors 41 and 42 complete the circuit by ultimately connecting to the other direct current conductor three. In tests the use of this dual core invertor transformer, in the afore- mentioned invertor systems, improved the performance by a small amount.

Figure 7:
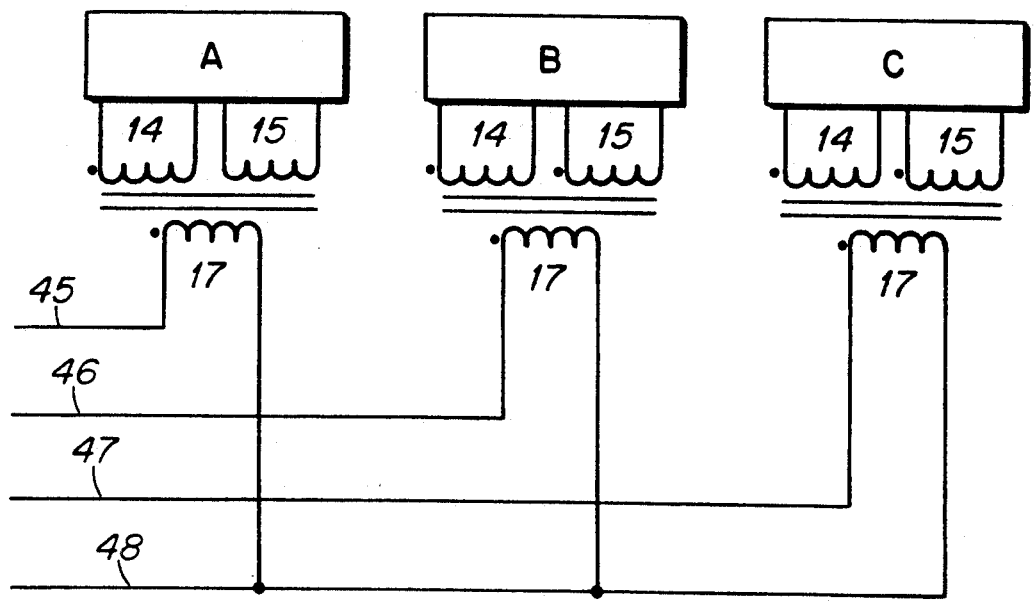
FIG. 7 is a schematic of a system to produce three phase alternating current of the Wye configuration and can use any one of the aforementioned invertor systems to provide current to the primaries.

Reference to FIG. 7. This system is to convert direct current to three phase alternating current. Specifically, "A" represents any of the previously described invertor systems at 0 degrees phase, "B" represents any of the previously described invertor systems at 120 degrees phase in respect to "A". "B" represents any of the previously described invertor systems at 240 degrees phase with respect to "A". The primaries 14 and 15 are the single core invertor transformer primaries previously described. The secondary windings 17 are the same as previously described. Conductors 45, 46 and 47 each conduct current 120 degrees out of phase with each other. Conductor 48 is the neutral and is grounded through earth ground 49.

Figure 8:
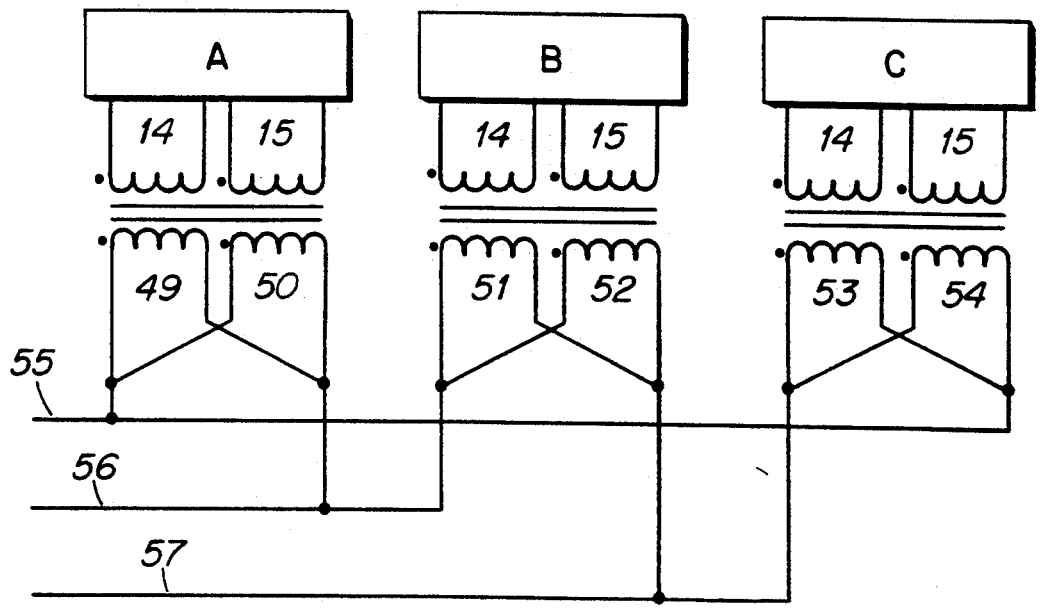
FIG. 8 is a schematic of a system to produce three phase alternating current of the Delta configuration and uses any one of the aforementioned invertor systems to provide current to the primaries.

Reference to FIG. 8. This system is similar to the system described previously as FIG. 7. The differences are the resultant delta connection in lieu of the Wye connections. specifically FIGS. 49, 50, 51, 52, 53 and 54 are the secondary coils in invertor transformers and conductors 55, 56 and 57 are the conductors that will carry the three phase current.

A complete description of the functions of each coil can be found in any Electrical Engineering Handbook.

What is claimed is:

1. An invertor system utilizing inductive reactance to pulse direct current for purposes of producing alternating current, said system consisting of a signal generator supplying current through two conductors connected to separate windings on separate ferromagnetic cores of separate fluxgates, said current to terminate in a suitable capacitor for completion of said signal circuit, said signal current establishes at any one time opposite electro magnetic fields in each core, to control a direct current source with one of the conductors branched, with each branch passing through a rectifier to prevent reverse flow through that branch, and thence on through a power winding on the core of the fluxgate as determined by the signal generator current, said power current contributes to the signal power further resisting power current flow through said other fluxgate, and thence continues on and flows in a reverse direction through a trigger coil on said other fluxgate and in the process bleeding off energy stored in the core of said other fluxgate, thereby permitting said signal current to reverse direction, said power current then proceeds through one of the primary coils of an invertor transformer completing the first half cycle and upon completion of the second half of the above noted half cycle wherein the above noted flow is reversed pulses moving alternately in opposite direction produces alternating current through the secondary coil of said invertor transformer.

2. An invertor system as set forth in claim 1 consisting of a dual core invertor transformer containing two each ferromagnetic cores with each core wound with a primary winding that upon being pulsed produces a magnetic field thereby inducing a current flow in a secondary coil wound on the same core and a second primary wound on the same core connected to the first primary on the other core in such a way as to produce an opposite magnetic field force to neutralize the retained part of said magnetic field thereby producing an induced current in the secondary windings of said other core with said secondary windings connected to the conductors as to have the induced current additive to the current in the other secondary.

* * * * *